United States Patent
Barguet et al.

(10) Patent No.: US 8,191,348 B2
(45) Date of Patent: Jun. 5, 2012

(54) LAYERED CORD FOR TIRE BELT

(75) Inventors: Henri Barguet, Les Martres-D'Artiere (FR); Brigitte Chauvin, Chamalieres (FR); Alain Domingo, Orleat (FR); Le Tu Anh Vo, Clamart (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 761 days.

(21) Appl. No.: 11/659,247

(22) PCT Filed: Aug. 1, 2005

(86) PCT No.: PCT/EP2005/008312
§ 371 (c)(1),
(2), (4) Date: Dec. 3, 2008

(87) PCT Pub. No.: WO2006/013077
PCT Pub. Date: Feb. 9, 2006

(65) Prior Publication Data
US 2009/0101266 A1  Apr. 23, 2009

(30) Foreign Application Priority Data
Aug. 2, 2004  (FR) .................................... 04 08553

(51) Int. Cl.
*D02G 3/02* (2006.01)

(52) U.S. Cl. .......................................................... 57/223

(58) Field of Classification Search .................... 57/210, 57/212, 223, 232, 237, 241
See application file for complete search history.

(56) References Cited

U.S. PATENT DOCUMENTS

| | | |
|---|---|---|
| 4,215,021 A | 7/1980 | Ogawa et al. |
| 4,960,473 A | 10/1990 | Kim et al. |
| 5,279,695 A | 1/1994 | Starinshak et al. |
| 6,120,911 A | 9/2000 | Beers et al. |
| 2002/0134478 A1* | 9/2002 | Noferi ......................... 152/451 |
| 2005/0133140 A1* | 6/2005 | Lee et al. ...................... 152/556 |
| 2006/0124219 A1* | 6/2006 | Miyazaki et al. ............. 152/527 |

FOREIGN PATENT DOCUMENTS

| | | |
|---|---|---|
| AT | 395 732 B | 2/1993 |
| EP | 1 186 699 A | 3/2002 |
| EP | 1 293 600 A | 3/2003 |
| JP | 55 151052 A | 11/1980 |
| WO | WO 99/31313 A | 6/1999 |

* cited by examiner

*Primary Examiner* — Shaun R Hurley
(74) *Attorney, Agent, or Firm* — Cozen O'Connor

(57) ABSTRACT

A compact metal cable having two layers (C1, C2) of construction 1+N, rubberized in situ, usable in particular as a reinforcing element for a tire belt for a heavy industrial vehicle, comprising a core or inner layer (C1) comprising a single core wire of diameter $d_1$, and a saturated outer layer (C2) of N wires of diameter $d_2$ wound together in a helix at a pitch $p_2$ around the layer C1. The layered cable has the following characteristics ($d_1$, $d_2$, $p_2$ in mm): $0.15 < d_1 < 0.50$; $0.15 < d_2 < 0.50$; $8 < p_2 < 25$. The core wire is surrounded by a sheath of diene rubber which fills, at least in part, the gaps between the core wire and the cords of the layer C2.

23 Claims, 2 Drawing Sheets

LAYERED CORD FOR TIRE BELT

RELATED APPLICATION

This is a U.S. National Phase Application under 35 USC 371 of International Application PCT/EP2005/008312, filed on Aug. 1, 2005.

FIELD OF THE INVENTION

The present invention relates to two-layer metal cables, of construction 1+N, usable in particular for reinforcing rubber articles.

It also relates to tires and to the reinforcement armatures of the crown, also referred to as "belts", of these tires, in particular to the reinforcement of the belts of tires for heavy industrial vehicles.

BACKGROUND OF THE INVENTION

A tire having a radial carcass reinforcement in known manner comprises a tread, two inextensible beads, two sidewalls joining the beads to the tread and a belt arranged circumferentially between the carcass reinforcement and the tread, this belt being formed of various plies (or "layers") of rubber which may or may not be reinforced by reinforcement elements ("reinforcing threads") such as cables or monofilaments, of the metallic or textile type.

DETAILED DESCRIPTION OF THE DRAWINGS

The tire belt is generally formed of at least two superposed belt plies, sometimes referred to as "working" plies or "crossed" plies, the generally metallic reinforcement cables of which are arranged in practice parallel to one another within a ply, but crossed from one ply to the other, that is to say inclined, whether symmetrically or not, relative to the median circumferential plane, by an angle which is generally of between 10° and 45° depending on the type of tire in question. The crossed plies may be finished off by various other plies or auxiliary layers of rubber, of widths which are variable depending on the case, and which may or may not comprise reinforcing threads; mention will be made by way of example of simple cushions of rubber, what are called "protective" plies, the role of which is to protect the rest of the belt from external attack and perforations, or alternatively what are called "hooping" plies comprising reinforcing threads oriented substantially in the circumferential direction (what are called "zero-degree" plies), be they radially external or internal relative to the crossed plies.

A tire belt must in known manner fulfil various demands, which are frequently contradictory, in particular:

- be as rigid as possible at low deformation, because it contributes substantially to stiffening the crown of the tire;
- have a hysteresis which is as low as possible, in order on one hand to minimise the heating during travel of the inner zone of the crown and on the other hand to reduce the rolling resistance of the tire, which is synonymous with saving fuel;
- finally have high endurance, with respect in particular to the phenomenon of separation, cracking of the ends of the crossed plies in the shoulder zone of the tire, known by the name "cleavage", which requires in particular the metal cables which reinforce the belt plies to have high fatigue strength in compression, all in a more or less corrosive atmosphere.

The third demand is particularly strong for heavy-vehicle tires, designed to be able to be retreaded one or more times when the treads which they comprise reach a critical degree of wear after prolonged travel.

For the reinforcement of the belts above, generally steel cables ("steel cords") referred to as "layered" ("layered cords"), formed of a central core and one or more concentric layers of wires arranged around this core, are used. The layered cables most used are essentially cables of construction M+N or M+N+P, formed in known manner of a core of M wire(s) surrounded by at least one layer of N wires, possibly itself surrounded by an outer layer of P wires.

The availability of carbon steels which are becoming ever stronger and more enduring, in particular, means that tire manufacturers nowadays, as much as possible, are tending towards the use of cables having only two layers, in order in particular to simplify the manufacture of these cables, reduce the thickness of the composite reinforcement plies, and ultimately reduce the costs of the tires themselves.

The two-layer cables essentially used hitherto in the belts of tires are essentially cables of construction 2+7, 3+8 and 3+9, formed of a core or centre of 2 or 3 wires and an outer layer of N wires (respectively 7, 8 or 9 wires) which is more or less unsaturated owing to the large diameter of the core produced by the presence of the two or three core wires.

It is known that this type of construction promotes the ability of the cable to be penetrated from the outside by the calendering rubber of the tire or of the rubber article during the curing of the latter, and consequently makes it possible to improve the endurance of the layered cables in terms of fatigue and fatigue-corrosion, particularly with respect to the problem of cleavage mentioned previously.

These 2+7, 3+8 and 3+9 cables are however not without drawbacks.

Cables of construction 3+8 and 3+9 cannot be penetrated as far as the core owing to the presence of a channel or capillary at the centre of the three core wires, which remains empty after impregnation by the rubber, and therefore favourable to the propagation of corrosive media such as water. As for 2+7 cables, as furthermore with the previous ones, they are still relatively bulky with a low strength per unit of section owing to their unsaturated outer layer.

Furthermore, one major objective of a tire manufacturer wishing to reduce the hysteresis of the belts of tires is nowadays to reduce the thickness of the composite reinforcement fabrics used in these belts, in particular owing to the use of highly compact cables.

In continuing their research, the Applicants have discovered a novel layered cable, of construction 1+N, rubberized in situ, which not only has increased resistance to corrosion, but also and above all imparts improved endurance in compression to the belts of the tires. The longevity of the tires and that of their crown reinforcements is thus significantly improved, very particularly with regard to the phenomenon of cleavage previously explained.

SUMMARY OF THE INVENTION

Consequently, a first subject of the invention is a compact metal cable having two layers (C1, C2) of construction 1+N, usable in particular as a reinforcing element for a tire belt for a heavy industrial vehicle, comprising a core or inner layer (C1) comprising a single core wire of diameter $d_1$, and a saturated outer layer (C2) of N wires of diameter $d_2$ wound together in a helix at a pitch $p_2$ around the layer C1, said layered cable being characterized:

in that it has the following characteristics ($d_1$, $d_2$, $p_2$ in mm):

$0.15 < d_1 < 0.50$;
$0.15 < d_2 < 0.50$;
$8 < p_2 < 25$;

and in that the core wire is surrounded by a sheath of diene rubber which fills, at least in part, the gaps between the core wire and the wires of the layer C2.

The invention also relates to the use of a cable according to the invention for reinforcing articles or semi-finished products made of rubber, for example plies, tubes, belts, conveyor belts and tires.

The cable of the invention is very particularly intended to be used as a reinforcing element for a belt for a tire intended for heavy industrial vehicles selected from among vans, "heavy vehicles"—i.e. subway trains, buses, road transport machinery (lorries, tractors, trailers), off-road vehicles—agricultural machinery or construction machinery, aircraft and other transport or handling vehicles.

The cable of the invention could however be used, according to other possible embodiments of the invention, to reinforce other parts of tires, in particular carcass reinforcements of tires for industrial vehicles such as heavy vehicles.

The invention furthermore relates to these articles or semi-finished products made of rubber themselves when they are reinforced by a cable according to the invention, in particular tires intended for industrial vehicles such as heavy vehicles.

SUMMARY OF THE INVENTION

I. MEASUREMENTS AND TESTS

I-1. Dynamometric Measurements

Figure 1:
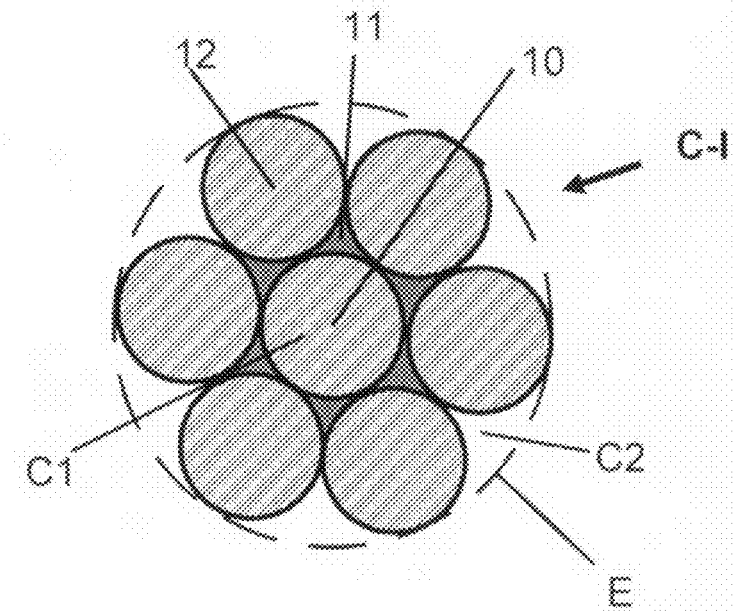
FIG. 1 shows in cross-section, a cable of construction 1+6 according to an embodiment of the invention, usable in a crown reinforcement for a heavy-vehicle tire.

As regards the metal wires and cables, the measurements of breaking load Fm (maximum load in N), tensile strength Rm (in MPa) and elongation at break At (total elongation in %) are carried out under tension in accordance with Standard ISO 6892 of 1984.

As regards the rubber compositions, the modulus measurements are carried out under tension, unless indicated otherwise in accordance with Standard ASTM D 412 of 1998 (test piece "C"): the "true" secant modulus (that is to say reduced to the real section of the test piece) at 10% elongation, referred to as E10 and expressed in MPa, is measured in a second elongation (that is to say after an accommodation cycle) (normal conditions of temperature and relative humidity in accordance with Standard ASTM D 1349 of 1999).

I-2. Air Permeability Test

The air permeability test is a simple way of indirectly measuring the amount of penetration of the cable by a rubber composition. It is performed on cables extracted directly, by decortication, from the vulcanized rubber plies which they reinforce, and which therefore have been penetrated by the cured rubber.

The test is carried out on a given length of cable (for example 2 cm) as follows: air is sent to the entry of the cable, at a given pressure (for example 1 bar), and the volume of air at the exit is measured, using a flow meter; during the measurement, the sample of cable is locked in a seal such that only the quantity of air passing through the cable from one end to the other, along its longitudinal axis, is taken into account by the measurement. The flow rate measured is all the lower, the higher the amount of penetration of the cable by the rubber.

II. DETAILED DESCRIPTION OF THE INVENTION

In the present description, unless expressly indicated otherwise, all the percentages (%) indicated are mass percentages.

II-1. Cable of the Invention

The compact metal cable having two layers (C1, C2) according to the invention, of construction 1+N, comprises a core or inner layer C1 comprising a single core wire of diameter $d_1$, and a saturated outer layer C2 of N wires of diameter $d_2$ wound together in a helix at a pitch $p_2$ around the layer C1, said layered cable being characterized:

in that it has the following characteristics ($d_1$, $d_2$, $p_2$ in mm):

$0.15 < d_1 < 0.50$;
$0.15 < d_2 < 0.50$;
$8 < p_2 < 25$;

and in that the core wire is surrounded by a sheath of diene rubber which fills, at least in part, the gaps between the core wire and the wires of the layer C2.

In other words, the cable of the invention is rubberized internally (i.e. filled at least in part with rubber or "rubberized in situ"): its core wire and its layer C2 are separated radially by a minimal thickness (or sheath) of rubber (diene elastomer composition), said sheathing rubber furthermore filling, in its entirety or in part, the gaps between core wire and wires of the layer C2.

Unless there is possible later coating with rubber or other polymer, the cable of the invention is therefore, as such, devoid of rubber or any other polymer sheath on its periphery (i.e. around the N wires constituting its outer layer C2), as shown for example in the appended FIG. 1.

Furthermore, a "compact" cable is to be understood here, in a manner known to the person skilled in the art, to be a cable the compactness of which is such that this cable cannot be penetrated from the outside by a polymer material, particularly rubber, even in the uncured state.

The wires of layers C1 and C2 may have a diameter which is identical or different from one layer to the other. Preferably wires of the same diameter from one layer to the other (i.e. $d_1 = d_2$) are used, as shown, for example, in the appended FIG. 1. The wire of the layer C1 is preferably made of steel, more preferably of carbon steel. Independently, the wires of the layer C2 are themselves made of steel, preferably of carbon steel.

According to a preferred embodiment, the layer C2 comprises from 5 to 10 wires, in other words the cable of the invention is selected from the group consisting of cables of constructions 1+5, 1+6, 1+7, 1+8, 1+9 and 1+10; particularly selected from among these cables are those formed of wires having substantially the same diameter from one layer to the other (namely $d_1 = d_2$).

According to a more preferred embodiment of the invention, the selected cable has the construction 1+6 or 1+7, more particularly 1+6.

FIG. 1 shows, in a section perpendicular to the axis of the cable (assumed to be rectilinear and at rest), an example of a preferred 1+6 cable (cable denoted C-I in the following examples), whereas FIG. 2 recalls the section through a conventional 2+7 cable (cable denoted C-II in the following examples).

The cable according to the invention comprises firstly an inner layer (or core) C1 formed of the core wire 10 covered, preferably over its entire periphery, with a minimal thickness of sheathing rubber 11, preferably of between 0.01 and 0.10 mm, more preferably still within a range from 0.02 to 0.06 mm, which is therefore less, generally very much less, than the diameter of said core wire.

The rubber sheath 11 of the cable of the invention extends continuously around said core wire 10 which it covers, that is to say that this sheath is continuous in the "orthoradial" direction of the cable (perpendicular to its radius). In other words, taking into account the range of variation of the diameter $d_1$, the layer C1 formed of the core wire and of the minimal thickness of sheathing rubber which surrounds it has a preferred diameter of between 0.16 mm and 0.60 mm, more preferably within a range from 0.17 to 0.56 mm.

The layer C1 is itself surrounded by and in contact with an outer layer C2 of six wires 12 (of the same diameter as the core wire 10) which are wound together in a helix at a pitch $p_2$ around the layer C1, and therefore of a thickness substantially equal to the diameter $d_2$ of said wires 12. It can be seen that the wires 10 and 12 are thus arranged in two adjacent, concentric, tubular layers (layers C1 and C2), giving the cable its cylindrical contour E.

For comparison, in the cable C-II according to the prior art, the inner layer C1 is formed of two wires 20 wound together in a helix at a pitch $p_1$, which inner layer is itself surrounded by and in contact with an outer layer C2 of seven wires 21 wound together in a helix at a pitch $p_2$ around the layer C1, and therefore of a thickness substantially equal to the diameter $d_2$ of said wires. The wires 20 and 21 are thus also arranged in two adjacent, concentric, tubular layers (layers C1 and C2), giving the cable its cylindrical contour E.

The rubber sheath 11 covers the core wire 10 of the cable of the invention, but also fills, at least in part, the gaps between the core wire 10 and the wires 12 of the layer C2.

According to one particularly preferred embodiment, these gaps are totally filled by the sheathing rubber 11, as shown in FIG. 1, said sheathing rubber 11 thus covering practically at least half the radially inner circumference of the wires 12 of the layer C2.

According to a preferred embodiment of the invention, the following characteristics are satisfied ($d_1$, $d_2$ in mm):
 $0.15 < d_1 < 0.50$;
 $0.25 < d_2 < 0.40$;
 $0.6 < (d_1/d_2) < 1.25$.

According to a more preferred embodiment, the following characteristics are satisfied ($d_1$, $d_2$ in mm):
 $0.20 < d_1 < 0.48$;
 $0.25 < d_2 < 0.40$;
 $0.8 < (d_1/d_2) < 1.2$.

The layer C1 thus has, in this latter case, a preferred diameter of between 0.21 mm and 58 mm (more preferably within a range from 0.22 to 0.54 mm).

For an optimised compromise between strength, feasibility, rigidity and endurance in compression of the cable, it is preferred that the diameters of all the wires of layers C1 and C2, whether or not these wires are of identical diameters, be within a range from about 0.26 to 0.36 mm, the layer C1 therefore having in this case a preferred diameter within a range from about 0.27 to 0.46 mm (more preferably from 0.28 to 0.42 mm).

The pitch $p_2$ is selected more preferably between 10 and 20 mm, in particular when $d_1 = d_2$, more preferably still within a range from 14 to 18 mm.

It will be recalled here that in known manner the pitch "p" represents the length, measured parallel to the axis of the cable, at the end of which a wire having this pitch makes a complete turn around said axis of the cable.

"Metal cable" is understood by definition to mean a cable formed of wires made majoritarily (that is to say to more than 50% of these wires) or fully (for 100% of the wires) of a metallic material. The invention is preferably carried out with a steel cable, more preferably one made of perlitic (or ferritoperlitic) carbon steel hereinafter referred to as "carbon steel", or alternatively of stainless steel (by definition, steel comprising at least 11% chromium and at least 50% iron). However, it is of course possible to use other steels or other alloys.

When a carbon steel is used, its carbon content is preferably of between 0.4% and 1.2%, in particular between 0.5% and 1.1%. It is more preferably of between 0.6% and 1.0% (% by weight of steel), such a content representing a good compromise between the mechanical properties required for the composite and the feasibility of the wires.

The metal or steel used, be it in particular a carbon steel or a stainless steel, may itself be coated with a metallic layer which improves for example the processing properties of the metal cable and/or its constituent elements, or the use properties of the cable and/or of the tire themselves, such as the properties of adhesion, corrosion resistance or alternatively ageing resistance.

According to a preferred embodiment, the steel used is covered with a layer of brass (Zn—Cu alloy) or of zinc; it will be recalled that during the process of manufacturing the wires, the brass or zinc coating facilitates the drawing of the wire, as well as the sticking of the wire to the rubber. However, the wires could be covered with a fine metal layer other than brass or zinc, having for example the function of improving the corrosion resistance of these wires and/or the adhesion thereof to the rubber, for example a fine layer of Co, Ni, Al, or of an alloy of two or more of the compounds Cu, Zn, Al, Ni, Co, Sn.

The cables of the invention are preferably made of carbon steel and have a tensile strength (Rm) preferably greater than 2500 MPa, more preferably greater than 3000 MPa.

The total elongation at break (At) of the cable, the total of its structural, elastic and plastic elongations (At=As+Ae+Ap), is preferably greater than 2.5%, more preferably greater than 3.0%.

The person skilled in the art will know how to manufacture steel wires which result in such characteristics, by adjusting in particular the composition of the steel and the final work-hardening ratios of these wires, according to his own particular needs, using for example micro-alloyed carbon steels containing specific alloying elements such as Cr, Ni, Co, V, or various other known elements (see for example *Research Disclosure* 34984—"*Micro-alloyed steel cord constructions for tires*"—May 1993; *Research Disclosure* 34054—"*High tensile strength steel cord constructions for tires*"—August 1992).

The cable of the invention therefore comprises around its core wire a rubber matrix or composition (called "sheathing rubber") comprising at least one diene elastomer.

The diene elastomer is preferably selected from the group consisting of polybutadienes (BR), natural rubber (NR), synthetic polyisoprenes (IR), the various butadiene copolymers, the various isoprene copolymers, and mixtures of these elastomers. Such copolymers are more preferably selected from the group consisting of butadiene/styrene copolymers (SBR), whether the latter be prepared by emulsion polymerisation (ESBR) or by solution polymerisation (SSBR), isoprene/butadiene copolymers (BIR), isoprene/styrene copolymers (SIR) and isoprene/butadiene/styrene copolymers (SBIR).

A preferred embodiment consists of using an "isoprene" elastomer, that is to say an isoprene homopolymer or copolymer, in other words a diene elastomer selected from the group consisting of natural rubber (NR), synthetic polyisoprenes (IR), the various isoprene copolymers and mixtures of these elastomers.

The isoprene elastomer is preferably natural rubber or a synthetic polyisoprene of the cis-1,4 type. Of these synthetic polyisoprenes, preferably polyisoprenes having a content (mole %) of cis-1,4 bonds greater than 90%, more preferably still greater than 98%, are used. According to other preferred embodiments, the diene elastomer may be constituted, in its entirety or in part, of another diene elastomer such as, for example, an SBR elastomer used in a blend or not with another elastomer, for example of the BR type.

The sheathing rubber may contain a single or several diene elastomer(s), the latter possibly being used in association with any type of synthetic elastomer other than a diene elastomer, or even with polymers other than elastomers.

The sheathing rubber is of the cross-linkable or cross-linked type, that is to say that it by definition comprises a cross-linking system suitable to permit cross-linking of the composition upon the curing thereof (i.e. its hardening). Preferably, the cross-linking system for the rubber sheath is what is called a vulcanization system, that is to say one based on sulfur (or a sulfur donor) and a primary vulcanization accelerator. Various known secondary accelerators or vulcanization activators may be added to this base vulcanization system. The sulfur is used in a preferred amount of between 0.5 and 10 phr, more preferably of between 1 and 8 phr; the primary vulcanization accelerator, for example a sulfenamide, is used in a preferred amount of between 0.5 and 10 phr, more preferably between 0.5 and 5.0 phr.

The sheathing rubber may also comprise, in addition to said cross-linking system, all or some of the additives usually used in rubber matrices intended for the manufacture of tires, such as for example reinforcing fillers such as carbon black or inorganic fillers such as silica, coupling agents, anti-ageing agents, antioxidants, plasticising agents or extender oils, whether the latter be of aromatic or non-aromatic nature (in particular oils which are only very slightly aromatic or non-aromatic, for example of the naphthenic or paraffinic type, of high or preferably of low viscosity, MES or TDAE oils, plasticising resins of high Tg greater than 30° C., agents which facilitate the processing (processability) of the compositions in the uncured state, tackifying resins, anti-reversion agents, methylene acceptors and donors such as for example HMT (hexamethylenetetramine) or H3M (hexamethoxymethylmelamine), reinforcing resins (such as resorcinol or bismaleimide), known adhesion-promoting systems of the metal salt type for example, in particular cobalt or nickel salts.

The amount of reinforcing filler, for example carbon black or a reinforcing inorganic filler such as silica, is preferably greater than 50 phr, for example of between 60 and 140 phr. It is more preferably greater than 70 phr, for example between 70 and 120 phr.

Suitable carbon blacks are all carbon blacks, particularly blacks of the type HAF, ISAF and SAF, conventionally used in tires (what are called tire-grade blacks). Of the latter, mention will more particularly be made of the carbon blacks of grade (ASTM) 300, 600 or 700 (for example N326, N330, N347, N375, N683, N772). Suitable reinforcing inorganic fillers are in particular mineral fillers of silica type ($SiO_2$), in particular precipitated or fumed silicas having a BET surface area of less than 450 $m^2/g$, preferably from 30 to 400 $m^2/g$.

The person skilled in the art will be able, in the light of the present description, to adjust the formulation of the sheathing rubber in order to achieve the desired levels of properties (in particular elasticity modulus), and to adapt the formulation to the specific intended application.

Preferably, the formulation of the sheathing rubber is selected to be identical to the formulation of the rubber matrix which the cables of the invention are intended to reinforce. Thus, there is no problem of compatibility between the respective materials of the sheathing rubber and of said rubber matrix which the cable of the invention is intended to reinforce.

Preferably, the sheathing rubber, in the cross-linked state, has a secant tensile modulus E10 (at 10% elongation) of between 5 and 25 MPa, more preferably between 5 and 20 MPa, in particular within a range from 7 to 15 MPa.

The cable according to the invention may be manufactured according to various techniques known to the person skilled in the art, for example:

(i) first of all by sheathing, via an extrusion head, the core wire (10) with the sheathing rubber (11) in the uncured state, followed by (ii) a final cabling operation, preferably in line with the previous one, of the N wires (12) of the layer C2 around the layer C1 thus rubberized, during which operation the N wires will come to bear on and become embedded in the uncured sheathing rubber, the latter then naturally tending to fill, at least in part, preferably totally, the gaps left empty between the core wire (10) and the wires (12) during the putting in place of the layer C2 under the pressure exerted by said wires (12) on the sheathing rubber.

The invention relates of course to the cable previously described, both in the uncured state (its sheathing rubber then being non-vulcanized) and in the cured state (its sheathing rubber then being vulcanized).

II-2. Tire of the Invention

The cable of the invention is advantageously usable in crown reinforcements for all types of tires, in particular for tires for industrial vehicles such as heavy vehicles.

Figure 3:
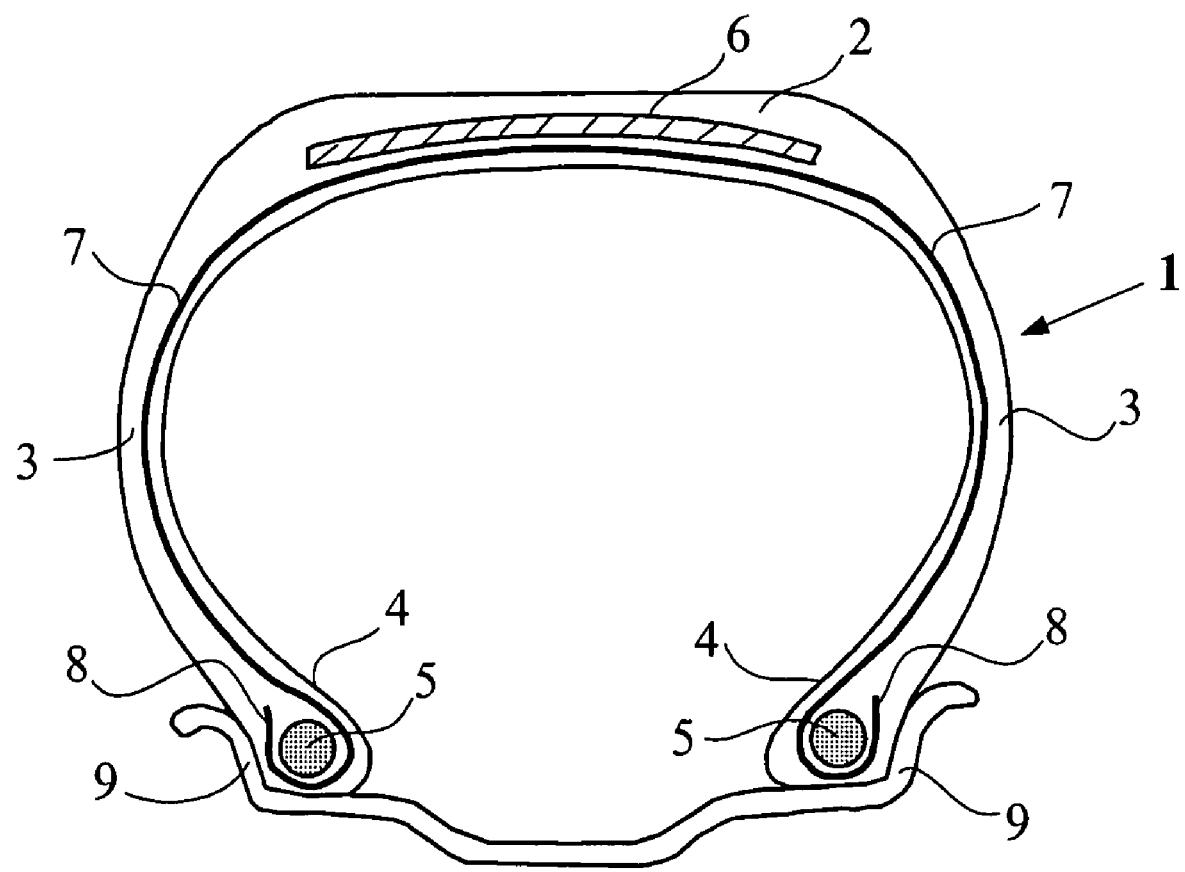
FIG. 3 shows in radial section, a heavy-vehicle tire having a radial carcass reinforcement, whether or not in accordance with the invention in this general representation.

By way of example, FIG. 3 shows diagrammatically a radial section through a tire having a metallic crown reinforcement which may or may not be in accordance with the invention, in this general representation. This tire 1 comprises a crown 2 reinforced by a crown reinforcement or belt 6, two sidewalls 3 and two beads 4, each of these beads 4 being reinforced by a bead wire 5. The crown 2 is surmounted by a tread not shown in this diagrammatic figure. A carcass reinforcement 7 is wound around the two bead wires 5 within each bead 4, the upturn 8 of this reinforcement 7 being for example arranged towards the outside of the tire 1, which is shown here mounted on its rim 9. The carcass reinforcement 7 in a manner known per se is formed of at least one ply reinforced by what are called "radial" cables, that is to say that these cables are arranged practically parallel to each other and extend from one bead to the other so as to form an angle of between 80° and 90° with the median circumferential plane (plane perpendicular to the axis of rotation of the tire which is located half-way between the two beads 4 and passes through the centre of the crown reinforcement 6).

The tire according to the invention is characterized in that its belt 6 comprises at least, as reinforcement of at least one of the belt plies, a two-layer metal cable according to the invention. In this belt 6, which is illustrated very simply in FIG. 3, it will be understood that the cables of the invention may for example reinforce all or part of what are called the working belt plies, or of what are called the triangulation plies (or half-plies) and/or of what are called the protective plies, when such triangulation or protective plies are used in the belt 6. In addition to the working plies, the triangulation and/or protective plies, the belt 6 of the tire of the invention may of course comprise other plies, for example one or more what are called hooping plies.

Of course, this tire 1 furthermore comprises in known manner an internal rubber or elastomer layer (commonly referred to as "internal rubber") which defines the radially inner face of the tire and which is intended to protect the carcass ply from the diffusion of air coming from the interior of the tire. Advantageously, in particular in the case of a tire for a heavy vehicle, it may furthermore comprise an intermediate elastomer reinforcement layer which is located between the carcass ply and the inner layer, intended to reinforce the inner layer and, consequently, the carcass ply, and also intended partially to delocalise the forces to which the carcass reinforcement is subjected.

In this belt ply, the density of the cables according to the invention is preferably between 15 and 80 cables per dm (decimeter) of belt ply, more preferably between 35 and 65 cables per dm of ply, the distance between two adjacent cables, from axis to axis, preferably being between about 1.2 and 6.5 mm, more preferably between about 1.5 and 3.0 mm.

The cables according to the invention are preferably arranged such that the width (L) of the rubber bridge, between two adjacent cables, is between 0.5 and 2.0 mm. This width L in known manner represents the difference between the calendering pitch (laying pitch of the cable in the rubber fabric) and the diameter of the cable. Below the minimum value indicated, the rubber bridge, which is too narrow, risks mechanically degrading during working of the ply, in particular during the deformation which it experiences in its own plane by extension or shearing. Beyond the maximum indicated, there are risks of penetration of objects occurring, by perforation, between the cables. More preferably, for these same reasons, the width L is selected to be between 0.8 and 1.6 mm.

Preferably, the rubber composition used for the fabric of the belt ply has, when vulcanized (i.e. after curing), a secant tensile modulus E10 which is between 5 and 25 MPa, more preferably between 5 and 20 MPa, in particular within a range from 7 to 15 MPa, when this fabric is intended to form a working ply of the belt. It is within such ranges of moduli that the best compromise of endurance was recorded between the cables of the invention on one hand and the fabrics reinforced with these cables on the other hand.

III. EXAMPLES OF EMBODIMENT OF THE INVENTION

III-1. Nature and Properties of the Wires Used

Figure 2:
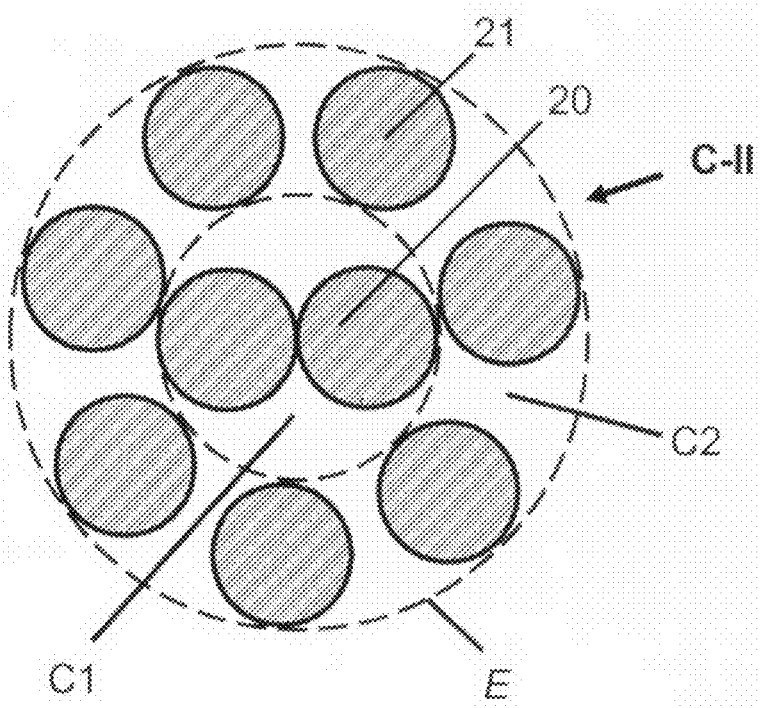
FIG. 2 shows in cross-section, a cable of construction 2+7 usable in a conventional crown reinforcement for a heavy-vehicle tire.

In the following tests layered cables of constructions 1+6 and 2+7 such as depicted in FIGS. 1 and 2, formed of fine carbon steel wires coated with brass, are used.

The carbon steel wires are prepared in known manner, starting, for example, from machine wires (diameter 5 to 6 mm) which are first of all work-hardened, by rolling and/or drawing, to an intermediate diameter close to 1 mm.

The steel used for the cable C-I (wires denoted "F-I") according to the invention is a carbon steel of the very-high-strength type (referred to as SHT for "Super High Tensile"), the carbon content of which is approximately 0.92%, comprising approximately 0.2% of chromium, the rest being formed of iron and the usual unavoidable impurities linked to the steel manufacturing process.

The one used for the control cable C-II (wires denoted "F-II") is a carbon steel of the high-strength type (referred to as HT for "High Tensile"), the carbon content of which is approximately 0.82%, comprising approximately 0.5% of manganese (rest formed of iron and impurities).

The wires of intermediate diameter undergo a degreasing and/or pickling treatment before their subsequent transformation. After depositing a brass coating on these intermediate wires, what is called "final" work-hardening is effected on each wire (i.e. after the final heat treatment of patenting), by cold-drawing in a wet medium with a drawing lubricant which is for example in the form of an aqueous emulsion or dispersion.

The steel wires thus drawn have the following diameters and mechanical properties:

TABLE 1

| Wires | φ (mm) | Fm (N) | Rm (MPa) |
|---|---|---|---|
| F-I | 0.350 | 263 | 2765 |
| F-II | 0.260 | 180 | 3380 |

The brass coating surrounding the wires is of very low thickness, significantly less than one micrometer, for example of the order of 0.15 to 0.30 μm, which is negligible compared with the diameter of the steel wires. Of course, the composition of the steel of the wire in terms of its different elements (for example C, Cr, Mn) is the same as that of the steel of the starting wire.

III-2. Production of the Cables

These wires are then assembled in the form of different cylindrical layered cables, referenced C-I and C-II, the construction and the mechanical properties of which are given in Table 2.

TABLE 2

| Cable | Construction | $p_1$ (mm) | $p_2$ (mm) | Fm (daN) | Rm (MPa) | At (%) |
|---|---|---|---|---|---|---|
| C-I | (1 + 6) 0.26 SHT | ∞ | 15.4 | 125 | 3315 | 2.7 |
| C-II | (2 + 7) 0.35 HT | 7.7 | 15.4 | 220 | 2560 | |

The 1+6 cable, as depicted in FIG. 1, is therefore formed of 7 wires F-I in total. It comprises a core C1 comprising the core wire sheathed with rubber (deposited via an extrusion head, before the wires of the layer C2 are put in place), this layer C1 being in contact with a cylindrical outer layer of 6 wires which themselves are wound together in a helix (S direction) around the core, at the pitch $p_2$. The rubber sheath here fills the entirety or virtually the entirety of the gaps between the core wire and the wires of the layer C2. It can clearly be seen that this cable of the invention is of the compact type, that is to say that its layer C2 cannot be penetrated from the outside by the rubber, even in the uncured state (not cross-linked).

The 2+7 control cable, as depicted in FIG. 2, is formed of 9 wires F-II in total. It comprises an inner layer C1 of 2 wires wound together in a helix (S direction) at the pitch $p_1$, this layer C1 being in contact with a cylindrical outer layer of 7 wires which themselves are wound together in a helix (S direction) around the core, at the pitch $p_2$. This cable, which is highly aerated and of low compactness compared with the cable C-I of the invention, is devoid of rubber.

The elastomeric composition (based on natural rubber and carbon black) constituting the sheathing rubber of the cable of the invention has the same formulation as that of the rubber belt ply which the cable C-I is intended to reinforce in the following test.

III-3. Endurance in Tire

The layered cables C-I and C-II are then incorporated by calendering in composite fabrics formed of a known composition based on natural rubber and carbon black as reinforcing filler, used conventionally for the manufacture of belt plies of radial heavy-vehicle tires. This composition essentially comprises, in addition to the elastomer and the reinforcing filler (carbon black), an antioxidant, stearic acid, an extender oil, cobalt naphthenate as adhesion promoter, and finally a vulcanization system (sulfur, accelerator, ZnO).

The composite fabrics reinforced by these cables comprise a rubber matrix formed of two fine layers of rubber which are superposed on either side of the cables and which have a thickness of 0.5 mm (cable C-I) or 0.8 mm (cable C-II) respectively. The calendering pitch (laying pitch of the cables in the rubber fabric) is 1.3 mm (cable C-I) or 2.8 mm (cable C-II).

Two series of running tests for heavy-vehicle tires (designated P-I and P-II) of dimensions 11R22.5 XZE are then carried out, with tires intended for running, and others for decortication on a new tire, in each series.

The tires P-I reinforced by the cables C-I of the invention are the tires according to the invention. The tires P-II reinforced by the cables C-II constitute the control tires of the prior art; owing to their recognised performance they constitute a control of choice for this test.

The tires P-I and P-II are therefore identical with the exception of the two-layer cables which reinforce their belts 6.

Their crown reinforcements or belts 6, in particular, are in a manner known per se formed of two triangulation half-plies reinforced with metal cables inclined at 65 degrees, surmounted by two superposed crossed "working plies". These working plies are reinforced with the above metal cables (C-I and C-II respectively) arranged substantially in parallel relative to one another and inclined by 26 degrees (radially inner ply) and 18 degrees (radially outer ply). The two working plies are furthermore covered by a protective ply reinforced with conventional elastic metal cables (high elongation) inclined by 18 degrees. All the angles of inclination indicated are measured relative to the median circumferential plane.

These tires are made to undergo a stringent running test, under overload conditions, intended to test their resistance to the phenomenon known as "cleavage" (separation of the ends of the belt plies), by subjecting the tires (on an automatic rolling machine) to sequences of very strong cornering and strong compression of their crown blocks in the shoulder zone. The test is carried out until forced destruction of the tires occurs.

It will then be noted that the tires P-I reinforced by the cables of the invention, under the very severe running conditions which are imposed thereon, exhibit distinctly improved endurance: the average distance traveled is increased by 35% relative to the control tires, which furthermore already exhibit an excellent performance.

The non-fatigued cables C-I and C-II, after extraction from the new tires, were furthermore subjected to the air permeability test described in section I-1, by measuring the volume of air (in $cm^3$) passing through the cables in 1 minute (average of 10 measurements).

Table 3 below shows the results obtained, in terms of average flow rate of air (average of 10 measurements—in relative units base 100 on the control cables) and of number of measurements corresponding to a zero air flow rate.

TABLE 3

| Cable | Average flow rate of air (relative units) | Number of measurements at zero flow rate: |
|---|---|---|
| C-I | 0 | 100/100 |
| C-II | 100 | 30/100 |

The cable C-I of the invention is the one which, by far, has the lesser air permeability, since it is virtually zero (average flow rate of air zero or practically zero) and consequently the greater amount of penetration by the rubber, taking into account its specific construction and the rubberizing thereof in situ.

Finally, adhesion tests showed a significantly improved resistance to corrosion, with gains which may reach 100 to 150% on the cables C-I of the invention, compared with the control cables C-II.

In conclusion, the cables of the invention make it possible to improve significantly the fatigue strength and/or corrosion resistance under compression, in particular the resistance to the phenomena of cleavage in the belts of heavy-vehicle tires.

Of course, the invention is not limited to the examples of embodiment described above.

Thus, for example, the core of the cable of the invention might be formed of a wire of non-circular section, for example one which is plastically deformed, in particular a wire of substantially oval or polygonal section, for example triangular, square or alternatively rectangular.

For reasons of industrial feasibility, cost and overall performance, it is however preferred to implement the invention with a single conventional linear core wire, that is to say one of circular section.

The core C0 might also be formed of a preformed wire, whether or not of circular section, for example an undulating or corkscrewed wire, or one twisted into the shape of a helix or a zigzag. In such cases, it should of course be understood that the diameter $d_1$ of the core represents the diameter of the imaginary cylinder of revolution which surrounds the core wire (diameter of bulk), and not the diameter (or any other transverse size, if its section is not circular) of the core wire itself.

The invention also relates to any multi-strand steel cable ("multi-strand rope"), the structure of which incorporates, at least, as the elementary strand, a layered cable according to the invention.

The invention claimed is:

1. A tire for heavy industrial vehicles comprising a carcass reinforcement anchored in two beads and radially surmounted by a belt that, in turn, is surmounted by a tread which is joined to said beads by two sidewalls, said belt comprising a compact metal cable consisting of two layers (C1, C2) of construction 1+N, rubberized in situ, comprising a core or inner layer (C1) comprising a single core wire of diameter $d_1$, and an outer layer (C2) saturated with N wires of diameter $d_2$ wound together in a helix at a pitch $p_2$ around the layer C1, said layered cable having the following characteristics ($d_1$, $d_2$, $p_2$ in mm):

$0.15 < d_1 < 0.50$;
$0.15 < d_2 < 0.50$;
$8 < p_2 < 25$;

and wherein the core wire is surrounded by a sheath of diene rubber which fills, at least in part, the gaps between the core wire and the wires of the layer C2.

2. The tire according to claim 1, wherein the diene elastomer of the rubber sheath is selected from the group consisting of polybutadienes, natural rubber, synthetic polyisoprenes, butadiene copolymers, isoprene copolymers and mixtures of these elastomers.

3. The tire according to claim 2, wherein the diene elastomer is selected from the group consisting of natural rubber, synthetic polyisoprenes, isoprene copolymers and mixtures of these elastomers.

4. The tire according to claim 3, wherein the diene elastomer is natural rubber.

5. The tire according to claim 1, wherein said rubber sheath comprises carbon black as reinforcing filler.

6. The tire according to claim 1, wherein the rubber sheath has, in the cross-linked state, a secant tensile modulus, at 10% extension, E10, which is between 5 and 25 MPa.

7. The tire according to claim 6, wherein the modulus E10 is between 5 and 20 MPa.

8. The tire according to claim 7, wherein E10 is within a range from 7 to 15 MPa.

9. The tire according to claim 1, wherein said cable has the following characteristics ($d_1$, $d_2$ in mm):

$0.15 < d_1 < 0.50$;
$0.25 < d_2 < 0.40$;
$0.6 < (d_1/d_2) < 1.25$.

10. The tire according to claim 9, said cable having the following characteristics ($d_1$, $d_2$ in mm):

$0.20 < d_1 < 0.48$;
$0.25 < d_2 < 0.40$;
$0.8 < (d_1/d_2) < 1.2$.

11. The tire according to claim 1, wherein $p_2$ is between 10 and 20 mm.

12. The tire according to claim 11, wherein $p_2$ is within a range from 14 to 18 mm.

13. The tire according to claim 1, wherein the layer C2 comprises five to ten wires.

14. The tire according to claim 13, wherein the layer C2 comprises six or seven wires.

15. The tire according to claim 14, wherein the layer C2 comprises six wires.

16. The tire according to claim 1, wherein the rubber sheath surrounding the core wire has a minimal thickness of between 0.01 mm and 0.10 mm.

17. The tire according to claim 16, wherein the rubber sheath surrounding the core wire has a minimal thickness within a range from 0.02 mm to 0.06 mm.

18. The tire according to claim 1, wherein the wire of the layer C1 comprises steel.

19. The tire according to claim 1, wherein the wire of the layer C2 comprises steel.

20. The tire according to claim 18, wherein the steel is carbon steel.

21. The tire according to claim 20, wherein the carbon content of the steel is between 0.4 and 1.2%.

22. The tire according to claim 21, wherein the carbon content of the steel is between 0.6 and 1.0%.

23. The tire according to claim 1, wherein $d_1 = d_2$.

* * * * *